Feb. 14, 1928.

J. J. F. ADAMS 1,658,960

ENGINE BRAKE

Filed March 18, 1926  3 Sheets-Sheet 1

Inventor
J. J. F. Adams
By Attorneys

Feb. 14, 1928.

J. J. F. ADAMS

ENGINE BRAKE

Filed March 18, 1926

Inventor
J. J. F. Adams
By Attorneys

Feb. 14, 1928.

J. J. F. ADAMS 1,658,960

ENGINE BRAKE

Filed March 18, 1926  3 Sheets-Sheet 3

Inventor
J. J. F. Adams
By Attorneys
Southgate
Fay & Horsley

Patented Feb. 14, 1928.

1,658,960

UNITED STATES PATENT OFFICE.

JOHN J. F. ADAMS, OF WORCESTER, MASSACHUSETTS.

ENGINE BRAKE.

Application filed March 18, 1926. Serial No. 95,747.

This invention relates to a brake for engines of various kinds but is particularly applicable to automobile engines. The principal objects of the invention are to provide an anti-friction brake connected with a shaft driven by the engine, thus avoiding the use of the ordinary brake bands, or if desired it can be used in addition to the ordinary brakes, particularly the emergency brake; also to provide a brake which can be regulated to apply a strong or light force simply by means of the foot pedal, and to provide a construction which will be self-lubricating and will not have parts likely to get out of order under the rough usage to which it may be put.

Other objects and advantages of the invention will appear hereinafter.

Reference is to be had to the accompanying drawings in which

This brake is capable of general use for engines of various kinds but, as it is particularly adapted for automobiles, I have shown it as applied to an ordinary type of automobile transmission. For that purpose I have shown the bottom of the car with the usual propeller shaft 10, differential 11, and other parts. In this propeller shaft I introduce a crank shaft 12 so that it constitutes a part of, and is in alignment with, the other sections of the propeller shaft 10. It can be connected thereto by flanges 13 or geared down from it.

Figure 3:
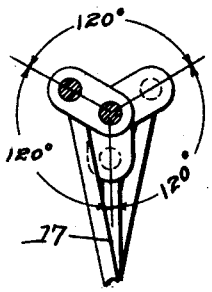
Fig. 3 is an end view of the propeller shaft showing the cranks on the brake section thereof.
Figure 4:
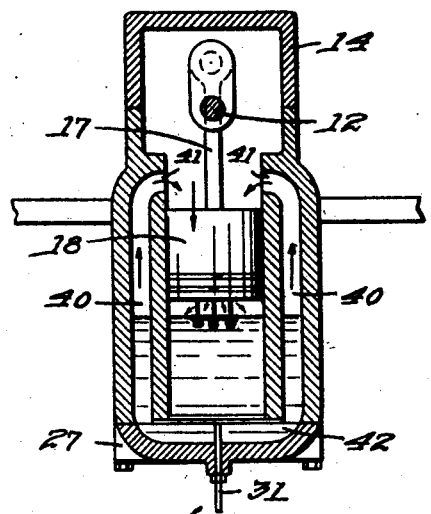
Fig. 4 is a sectional view of one of the brake cylinders on the line 4—4 of Fig. 2 showing the piston raised.
Figure 5:
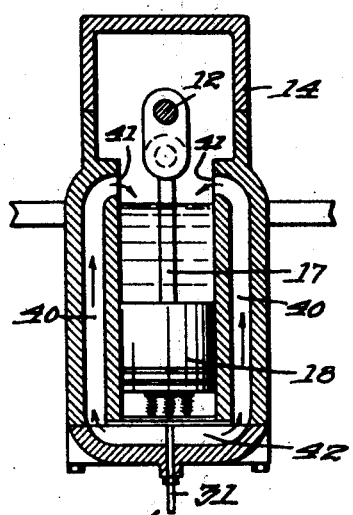
Fig. 5 is a similar view showing the piston down.
Figure 6:
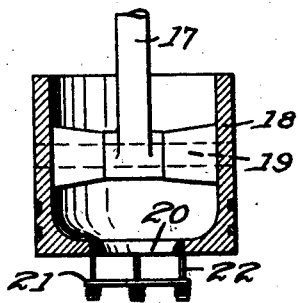
Fig. 6 is a central sectional view through one of the pistons on enlarged scale.
Figure 8:
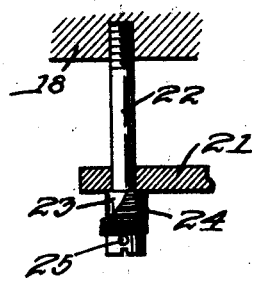
Fig. 8 is an enlarged sectional view showing a detail of the valve pin.
Figure 7:
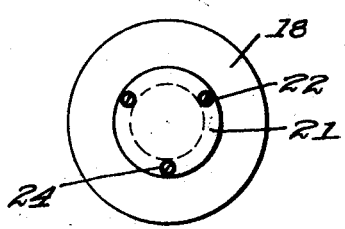
Fig. 7 is a bottom view of the piston.

The crank shaft passes through a casing 14 in which it has its bearings and which, in the present case, I have shown as being divided into three cylinders 15. The cylinders contain a liquid, preferably lubricating oil. The crank shaft has three cranks set 120 degrees apart as shown in Fig. 3. Of course the invention is not limited to any number of cranks and cylinders or to any particular way of setting the former. The cranks are connected by rods 17 with corresponding pistons 18 all alike and moving up and down in the cylinders or along them if the device is arranged horizontally.

Each of these pistons is hollow and the rod 17 is connected with it inside by a wrist-pin 19 on which the piston rod 17 is pivoted. The pistons can be packed in any desired way and each is provided with a port 20 in the bottom. There is a valve plate 21 for opening and closing the port 20. This plate is mounted on three or more longitudinal rods 22 so that it is capable of sliding back and forth, as will appear, to open and close the port. Each of the rods 22 is provided with an enlarged head or stop 23 below or beyond the plate 21 on which is a spring 24 bearing against a pin 25 on the lower end of the rod. These springs not only prevent the plate 21 coming up against the stops 23 with enough force to do any damage, but they exert a constant pressure on the plate 21 to help close it.

Figure 9:
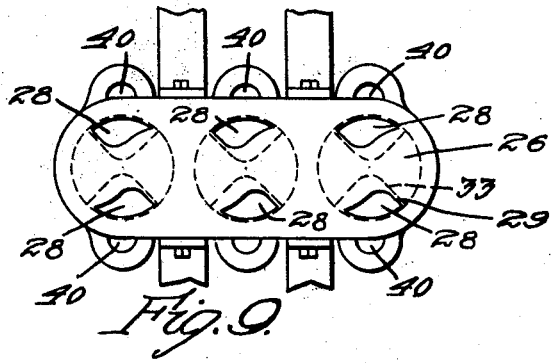
Fig. 9 is a bottom view of the brake.
Figure 11:
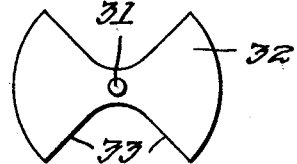
Fig. 11 is a plan of the regulating valve.

At the bottom of each cylinder it is provided with a plate 26. The three cylinders may have a single plate 26 extending throughout their lower areas and fixed properly in position over a bottom plate 27 which constitutes the bottom of the whole brake. In each of the cylinders there are two ports 28 through the plate 26 located opposite each other and having one side radial at 29 or approximately so and the other side 30 slanting or curved so as to perform a function to be described hereinafter. Extending up through the plates 27 and 26 are a series of oscillating rods 31 and on the upper end of each is a valve 32 located in the bottom of the cylinder in contact with the plate 26 for regulating the effective area of the openings 28. This valve is provided with two opposite enlargements having radial edges 33. When the valves are wide open, two of these edges 33 substantially register with the two opposite edges 29 above described as shown in Fig. 9.

The device is operated by an ordinary foot pedal 35 or of course in any other desired way. This pedal is shown as of an ordinary type having a spring 36 for holding it back and the valves open. With this pedal is connected a rod 37 which extends under the brake construction. With this rod are connected three arms 38 which are fixed on the three rods 31.

The cylinders 15 are provided with side passages 40, preferably on both sides, which extend from ports 41 in the sides of the cylinders around the cylinders and back into a transverse passage 42 in the plate 27 under the plate 26. The oil circulates through these passages. The rods 31 pass up through this passage in the form shown, but that is not essential.

Figure 1:
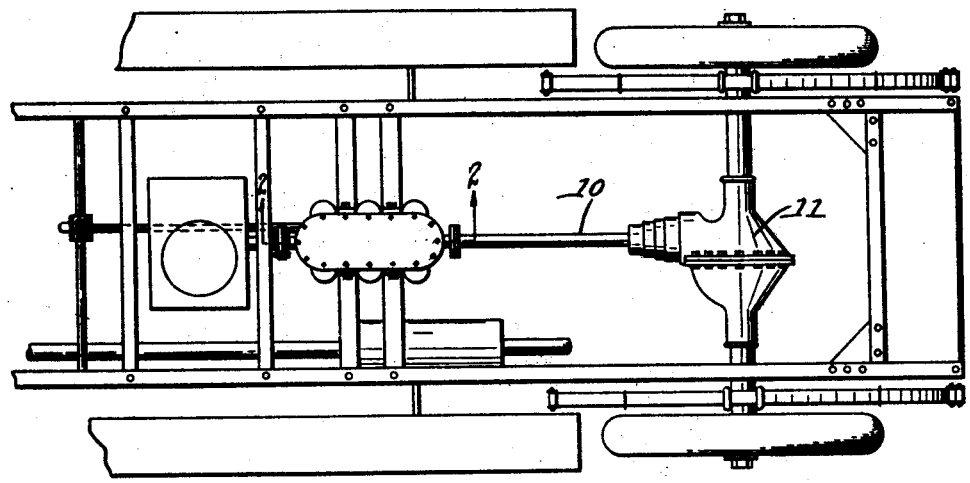
Fig. 1 is a plan of the propelling part of an automobile showing a preferred embodiment of this invention applied thereto.
Figure 2:
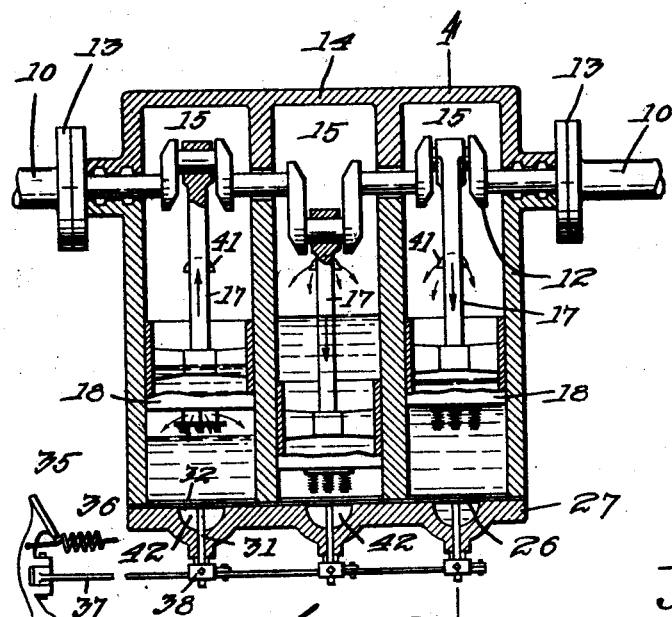
Fig. 2 is an enlarged sectional view on the line 2—2 of Fig. 1 longitudinally through the brake cylinders.

With the engine running in the ordinary way, the three pistons 18 reciprocate in accordance with the ordinary principles of this kind of construction but the oil in the cylinders circulates without resistance through the passages 40. As each piston goes down, the valve plate 21 thereon closes as shown in the center and right-hand piston in Fig. 2 and the oil is forced down through the ports 28, which are wide open, into the passage 42 and up the side passages 40 through the ports 41 into the same cylinder above the piston. As the piston rises, the valve plate 21 opens by the resistance of the oil and the oil flows out from above the piston to the space below it which is always filled. There is no resistance except the small amount required for the circulation of the oil through these parts.

Figure 10:
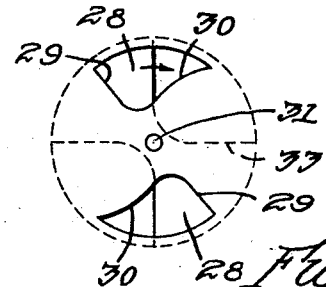
Fig. 10 is an enlarged view of the bottom of one of the cylinders as shown in Fig. 9.
Figure 12:
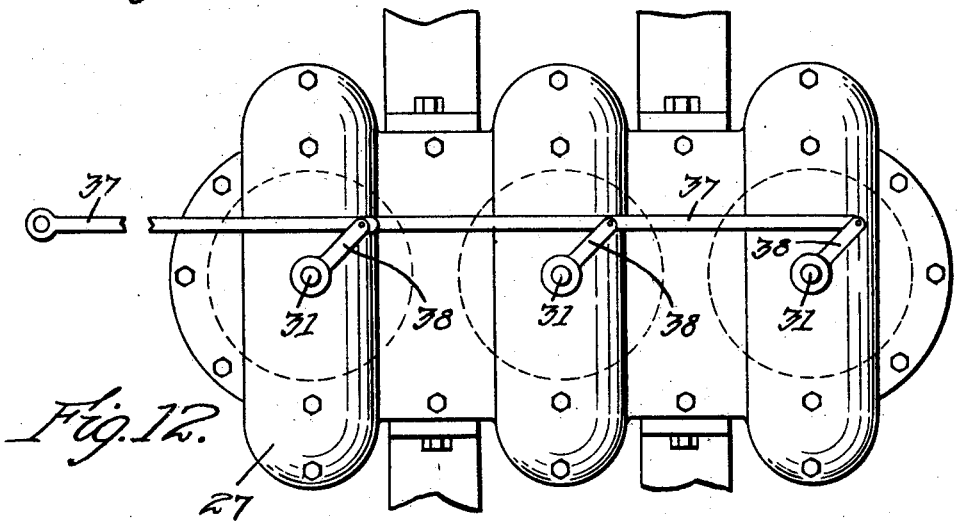
Fig. 12 is a bottom plan of the assembled brake showing the operating means.

When the brake is applied by pushing on the pedal 35, the arms 38 are all turned, taking with them the rods 31 and the valves 32. Each of the edges 33, that register with the edges 29 of the ports 28, immediately begins to cut off the effective opening of these ports 28 as indicated in Fig. 10. As the brake is applied with greater force, the valves 32 are swung further around until the ports decrease in effective size quite rapidly. The reason for making the edge 30 of the shape shown is to gradually taper off the complete closing of these ports so as to avoid sudden back pressure. The reduction in the effective areas of these ports 28 immediatey puts back pressure on the propeller shaft 10 so that immediately a braking action is secured and a strong one. But the total stoppage of the car is not effected unless the pedal is pushed way down and then it is not instantaneously accomplished, although it can be secured in a very short period as will be obvious from what has been said.

This constitutes an effective brake not presenting the wearing difficulties of the brakes now in use, requiring no relining, and having no construction by which the entrance of dirt and foreign particles or the wearing of the parts can affect the action of the brake in any way. This brake is self-lubricating on account of the fact that the liquid used in it preferably is oil, although some other liquid could be used with the same braking effect. If it is necessary to replenish the oil after long usage, the whole unit can be removed and inverted, the plates 26 and 27 taken off and the oil introduced at the end. The oil acts as a seal above and below each piston and prevents air leakage. Furthermore gravity aids suction in filling the cylinders on the upward stroke.

Although I have illustrated and described only a single form of the invention and shown it as applied to an automobile. I am aware of the fact that it can be applied to engines in various uses and of various types and that modifications can be made in the details of construction without departing from the scope of the invention as expressed in the claims. Therefore I do not wish to be limited to the details herein disclosed, but what I claim is:

1. In a brake, the combination of a shaft having a crank thereon, a vertical cylinder in which said crank is located, a piston in said cylinder operated by said crank, the cylinder having a lubricating liquid therein rising up above the piston, the piston being hollow and having a port at the end through which the liquid can circulate, a plate for closing said port, and yielding means for receiving the plate when it is moved to its open position.

2. The combination with an engine and a shaft connected to be operated thereby, of a casing comprising a plurality of vertical cylinders containing liquid, a corresponding number of pistons below the shaft and below the level of the liquid, means on said shaft for causing a relative reciprocation between the pistons and cylinders to circulate the liquid, each cylinder having an outlet port, a valve for controlling each outlet port, and means connected to all of said valves for moving them to restrict the effective area to said outlet ports when it is desired to stop or retard the engine, whereby the liquid acts as a seal above and below each piston, and the action of gravity aids the suction in filling the cylinders from below.

3. In a brake, the combination of a horizontal shaft having a series of cranks arranged at different angles, a plurality of pistons connected to said cranks, a corresponding number of vertical cylinders in which said pistons are located, said cylinders containing a liquid rising above the pistons, the shaft extending transversely though the cylinders above the pistons, each cylinder having an outlet, an oscillating valve for each cylinder adapted normally to expose the outlet and to be turned to a position to close it, a brake lever, and means connected with the lever for operating all of said valves simultaneously.

4. In a brake, the combination of a shaft having a plurality of cranks thereon set at different angles, a series of pistons to be operated thereby, a corresponding series of cylinders in which said pistons are located having means by which liquid can be circulated therein, a plate at the end of said cylinders having a pair of ports for each cylinder, each port having a substantially radial edge at one end and tapering at the other, a series of valves located in contact with each plate, one for each cylinder and each having two opposite projections having radial edges, each constituting a valve for controlling the effective openings through the said outlets, and means for oscillating said valves simultaneously.

5. In a brake, the combination of a shaft having a plurality of cranks arranged at angles thereon, a plurality of cylinders in which said cranks are located, pistons in said cylinders operated by said cranks, means for regulating the circulation of liquid in and out of the cylinders for the purpose of retarding or stopping the shaft, each piston being hollow and having a port at the end through which the liquid can circulate, a plate for closing said port adapted to be operated by the flow of the liquid in either direction, and yielding means for receiving the plate when it is moved to its open position.

6. In a brake, the combination of a shaft having a crank, a piston to be operated thereby, a cylinder in which said piston is located having means by which liquid can be circulated therein, a plate at the end of said cylinder having a port having a substantially radial edge at one end and tapering at the other, a valve located in contact with said plate and having two opposite projections having radial edges, constituting a valve for controlling the effective opening through the said outlet, and means for oscillating said valve.

7. In a brake, the combination of a shaft having a plurality of cranks thereon, a series of pistons to be operated thereby, a corresponding series of cylinders in which said pistons are located having means by which liquid can be circulated therein, a plate at the end of said cylinders having a pair of ports for each cylinder, a series of valves located in contact with each plate, one for each cylinder, and each having two opposite projections, each constituting a valve for controlling the effective openings through the said outlets, and means for oscillating said valves simultaneously.

8. In a brake, the combination of a vertical cylinder, a horizontal shaft having a crank thereon located within the cylinder, a piston in the cylinder below the crank and connected with the crank to be operated thereby, means for delivering the liquid in the cylinder from below the cylinder to the top of the piston when the piston moves downwardly, and means for permitting the liquid to pass into and through the piston when the piston is moved in the opposite direction.

In testimony whereof I have hereunto affixed my signature.

JOHN J. F. ADAMS.